United States Patent [19]
DeSmidt et al.

[11] 3,839,813
[45] Oct. 8, 1974

[54] DOWN RIGGER DIVING PLANE

[76] Inventors: Woodrow A. DeSmidt, 726 E. Day St., Whitefish Bay, Wis. 53217; Woodrow A. DeSmidt, Jr., 2724 Beaumont St., Green Bay, Wis. 54301

[22] Filed: Aug. 6, 1973

[21] Appl. No.: 385,824

[52] U.S. Cl.............................. 43/43.12, 43/43.13
[51] Int. Cl............................................ A01k 95/00
[58] Field of Search......................... 43/43.12, 43.13

[56] References Cited
UNITED STATES PATENTS

| | | | |
|---|---|---|---|
| 2,622,362 | 12/1952 | Jensen | 43/43.13 |
| 2,825,994 | 3/1958 | Bruhn | 43/43.13 |
| 3,738,047 | 6/1973 | Tozer | 43/43.12 |

*Primary Examiner*—Robert Peshock
*Assistant Examiner*—Daniel J. Leach
*Attorney, Agent, or Firm*—Quarles & Brady

[57] ABSTRACT

A diving plane comprising a central upright rudder and inclined deflection plates extending outwardly from each side thereof is attached to a fishing line which is to be suppressed to a desired depth. The central rudder has a releasable retaining mechanism including resiliently biased opposed jaws to receive a down rigger wire having a relatively heavy weight secured thereto. As the boat moves through the water, the diving plane slides down the wire as a result of the flow of water over the inclined deflection plates. When a fish strikes, the diving plane snaps free of the down rigger wire.

7 Claims, 5 Drawing Figures

PATENTED OCT 8 1974　3,839,813
SHEET 1 OF 2

PRIOR ART

PATENTED OCT 8 1974 3,839,813
SHEET 2 OF 2

DOWN RIGGER DIVING PLANE

BACKGROUND OF THE INVENTION

The field of the invention is deep trolling fishing equipment, and more particularly, down riggers used to depress fishing lines to great depths.

When fishing at depths of 50 feet or more, means other than a conventional sinker must be used to hold the lure and hook at the desired depth. One approach which is illustrated in U.S. Pat. No. 2,235,868 issued on Mar. 25, 1941 to L. E. Coolidge et al., and U.S. Pat. No. 3,466,787 issued on Sept. 16, 1969 to O. J. Collins, is to attach a "trolling plane" to the fishing line which exerts a downward force on the fishing line as it is pulled through the water. The depth to which such trolling planes submerge, however, is dependent on a variety of factors including the size and weight of the trolling plane, boat speed, fishing line size and length of fishing line. As a result, charts must be used by the fishermen to estimate how much fishing line should be paid out to reach the desired depth.

A more accurate means of depressing a fishing line to a desired depth is to use a down rigger such as that illustrated in FIG. 1. The down rigger includes a trolling unit 1 which is mounted to the gunwale of the boat. The trolling unit 1 has a reel 2 which receives a relatively heavy stainless steel wire 3 having a weight 4 connected to its end. The weight typically ranges between 5 and 15 pounds and the trolling unit includes a depth meter which indicates the depth of the weight 4 as it is paid out. The fishing line 5 with attached lure 6 is releasably attached to the weight 4 and when a fish strikes, the line 5 snaps free of the down rigger. Although an accurate depth is thus achieved, each time the fishing line 5 is reeled in, the weight 4 must be reeled in as well so that the fishing line 5 can be reattached. When fishing at great depths, this procedure is time consuming and hard work.

SUMMARY OF THE INVENTION

The present invention is an improved down rigger in which the weight need not be reeled in each time the fishing line is snapped loose. More specifically, the improvement comprises a diving plane which is securely fastened to the fishing line and which is releasably and slidably connected to the down rigger wire. The diving plane includes a deflection plate which is oriented at an incline when the diving plane is fastened to the down rigger wire, and a downward force is generated by the forward motion of the diving plane through the water to drive it and the attached fishing line downward along the down rigger wire.

A general object of the invention is to accurately depress a fishing line to a desired depth. The down rigger weight is lowered to the desired depth and the diving plane with attached fishing line is snapped onto the down rigger wire and dropped into the water. The diving plane slides downward along the down rigger wire until it reaches the weight.

Another object of the invention is to provide a light weight means of depressing a fishing line. Since the downward force generated by the flow of water across the deflection plate depresses the diving plane, it need not be heavy. It is constructed of a light weight material such as aluminum and when a fish strikes, the diving plane snaps free of the down rigger wire. As a result, the diving plane does not interfere with the play of the fish as the angler reels it in.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, and reference is made to the claims herein for interpreting the breadth of the invention.

DESCRIPTION OF THE PREFERRED EMBODIMENT

Figure 2:
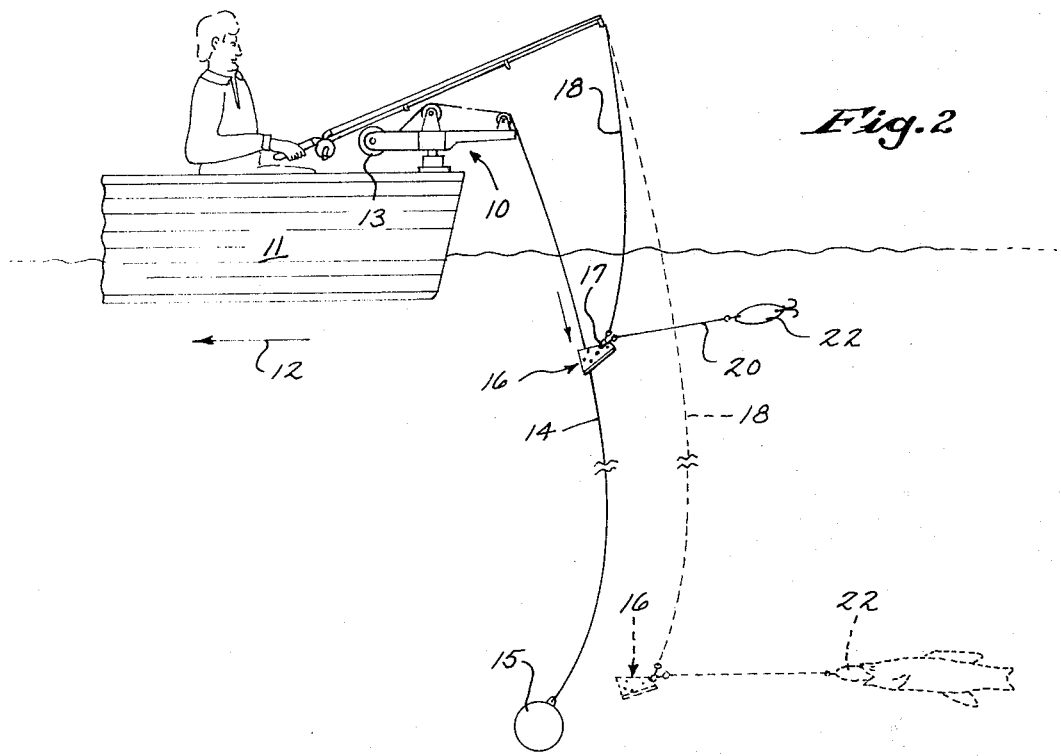
FIG. 2 is a pictorial view of the improved down rigger which incorporates the invented diving plane.

Referring to FIG. 2, a trolling unit 10 is fastened to the gunwale of a boat 11 which is moving forward through the water in the direction indicated by the arrow 12. The trolling unit 10 is a commercially available item which includes a reel 13 capable of holding 200 feet of stainless steel down rigger wire 14. A depth counter (not shown in the drawings) is mounted to the trolling unit 10 and it provides a visual indication of the amount of down rigger wire 14 that has been paid out. Connected to the end of the down rigger wire 14 is a weight 15 made of lead and weighing approximately 5 to 15 pounds. It should be apparent to those skilled in the art that the size of the wire 14 and size and composition of the weight 15 may be altered to meet various fishing conditions and depths.

Figure 1:
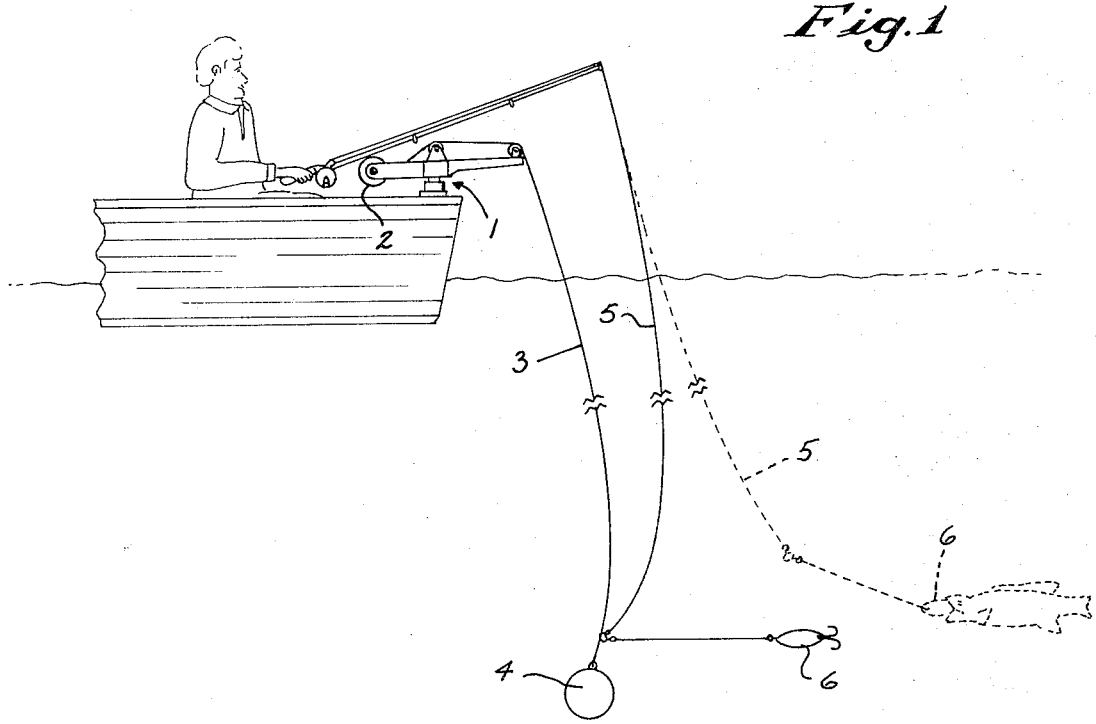
FIG. 1 is a pictorial view of a conventional prior art down rigger.

The down rigger is deployed by manually unreeling down rigger wire 14 until the weight 15 reaches the desired depth. When under way a uniform force is exerted by the water acting against the down rigger wire 14 and the weight 15. The weight 15 does not, therefore, hang directly beneath the gunwale and the down rigger wire 14 bows to form a parabolic-like arc. The curvature in the down rigger wire 14 is dependent on the speed of the boat 11, the diameter of the down rigger wire 14, and the size and depth of the weight 15. For example, when trolling at a speed of 2 miles per hour with a 10-pound weight 15 at 150 feet attached to a 0.020 inch diameter stainless steel down rigger wire 14, the down rigger wire 14 enters the water at a declining angle with respect to the vertical of approximately forty-five degrees, bends smoothly through vertical, and connects with the weight 15 at an inclining angle with respect to vertical of approximately ten degrees. In other words, the angle of the down rigger wire 14 changes along its length with respect to the surface of the water approximately fifty-five degrees as a result of water resistance. The significance of this fact will become apparent from the discussion which follows. The illustrations in FIGS. 1 and 2 show the parabolic-like arc, but are not to scale so as to necessarily show actual angles or curvature of the wire 14.

Figure 3:
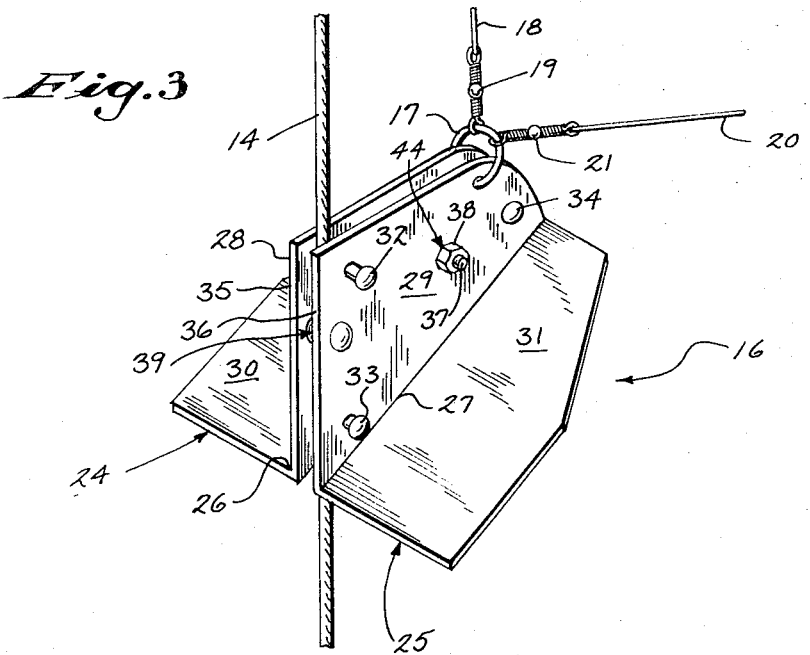
FIG. 3 is a perspective view of the invented diving plane.
Figure 4:
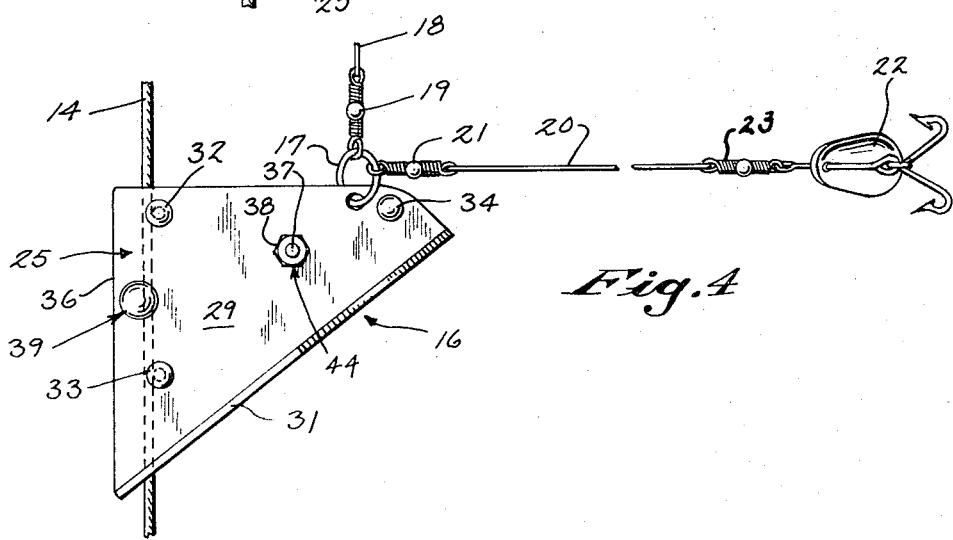
FIG. 4 is a side view of the invented diving plane.
Figure 5:
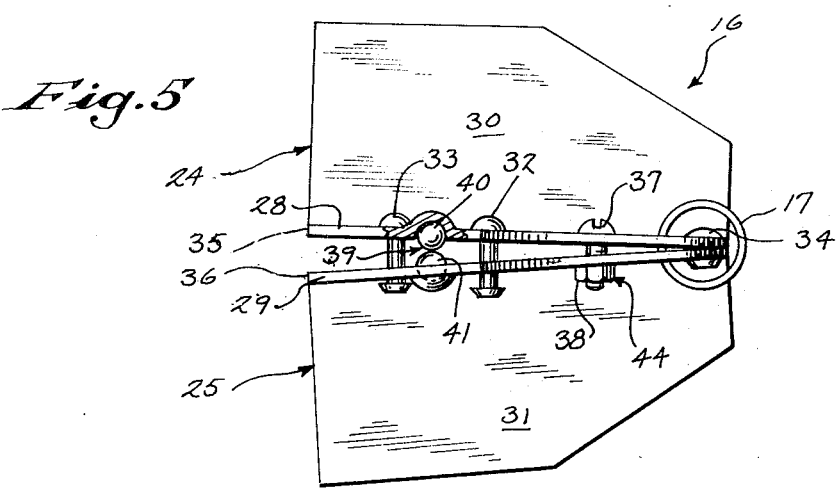
FIG. 5 is a view of the invented diving plane looking in a direction normal to the surface of the deflection plate forming a part of the device.

Referring to FIGS. 3-5, a diving plane 16 is slidably and detachably connected to the down rigger wire 14. A ring 17 is securely fastened to the diving plane and a fishing line 18 connects to the ring 17 through a swivel 19. One end of a leader 20 also connects to the ring 17 through a second swivel 21 and its other end connects to a lure 22 through a third swivel 23. A leader of approximately 4 to 6 feet is suggested.

The diving plane 16 is constructed from two sheets of twelve gauge sheet aluminum. The sheets are identically cut, but are bent in opposite directions along fold lines 26 and 27 to form symmetrical left and right sections 24 and 25. Each section 24 and 25 includes respectively an upright rudder portion 28, or 29, and a deflection plate portion 30, or 31. The rudder portions 28 and 29 of the left and right sections 24, 25 are joined together by three rivets 32, 33 and 34 to form a central member in the form of a rudder that decreases in height from the front to rear. As shown best in FIGS. 4 and 5, the rivets 32 and 33 pass through aligned openings in the respective rudder portions 28 and 29 and have heads on each of their ends to retain them in place. The rivets 32 and 33 are also positioned equidistant from the leading edges 35 and 36 on the respective rudder portions 28 and 29, and along a line which intersects the deflection plate formed of the plate portions 30, 31 at an angle of 53°. The rivet 34 is positioned near the trailing edges of the rudder portions 28 and 29 and is drawn tightly to bring the edges into contact with one another. As shown best in FIG. 5, an adjustable fastening device 44 also connects the sections 24 and 25. It includes a bolt 37 which passes through aligned openings in the rudder portions 28 and 29 and which receives a nut 38. The adjustable fastening device 44 is hand tightened to draw the two sections 24 and 25 together. Although the rivets 32 and 33 fit snugly within their openings to prevent lateral movement of the respective sections 24 and 25, they are sufficiently long to provide clearance beneath their heads. The clamping force which maintains the two sections 24 and 25 in tight engagement with one another is provided almost entirely by the adjustable fastening device 44.

Disposed between the rivets 32 and 33, but nearer the leading edges 35 and 36, is a releasable retaining mechanism 39. As shown best in FIG. 5, the retaining mechanism 39 is formed by embossing a pair of opposing dimples, or detents, in the rudder portions 28 and 29. A pair of steel balls 40 and 41 are placed within these detents between the rudder portions 28 and 29, and they are drawn into point contact with one another by the fastening device 34. By adjusting the fastening device 34 the pressure, or clamping force at the point of contact between the balls 40 and 41 may be altered.

As shown best in FIGS. 3 and 4, the diving plane 16 is attached to the down rigger wire 14 by forcing the wire 14 between the balls 40 and 41 and into a guideway bounded by the retaining mechanism 39 and the rivets 32 and 33. The sections 24 and 25 are flexible, and when attaching the diving plane 16 to a down rigger wire 14, the dividing force imposed on the balls 40 and 41 by the wire 14 separates them and the clamping force brings them back into point contact when the wire 14 is within the guideway. The balls 40, 41 thus form a pair of wire retaining jaws that are spring biased to a closing position. A snap action thus results when the wire 14 is inserted or withdrawn, and the diving plane 16 is slidably attached to the down rigger wire 14 with the deflection plate portions 30 and 31 disposed at an angle of 53° with respect to the down rigger wire 14. When a fish strikes the lure 22, a force is applied to draw the wire 14 between the balls 40 and 41 and the diving plane 16 is snapped free of the down rigger wire 14. By adjusting the fastening device 44, the clamping pressure between the balls 40 and 41 of the retaining mechanism 39 may be altered to adjust the force necessary to pull the diving plane 16 free of the down rigger wire 14. This adjustment allows the use of attractors and lures of varying size and "drag."

The releasable retaining mechanism 39, the rivets 32 and 33, and portions of the rudder sections between the rivets, define the guideway which orients the deflection plates 30 and 31 at an oblique angle of 53° with respect to the down rigger wire 14. When the down rigger wire 14 is vertical, therefore, the deflection plates 30 and 31 are at an inclined angle of 37° with respect to the surface of the water. Referring particularly to the example discussed above, due to the curvature in the down rigger wire 14, the diving plane 16 enters the water with its deflection plates inclined at a greater angle (approximately 82°) with respect to the water surface. As it slides down the down rigger wire 14, this angle continuously decreases to an angle of less than 37° (approximately twenty-seven degrees) with respect to horizontal. At this steep angle of entry the diving plane 16 may vibrate and have an initial slow speed of descent, but as the diving plane descends its speed rapidly becomes optimal and descent to the depth of the weight 15 is quite rapid. The continuously decreasing angle during descent may result in a decrease in stability, and a sidewise, to-and-fro motion may result. Therefore, the inclination of the deflection plates 30 and 31 cannot be decreased excessively. The inclination of the deflection plates 30 and 31 at fifty-three degrees with respect to the down rigger wire 14 appears to be an optimal value which insures both adequate speed of descent and sufficient stability when fully depressed for a range of down rigger wire angles that are encountered under different fishing conditions. It should be apparent to those skilled in the art, however, that deviations can be made from this value, and indeed, a limited amount of instability at low angles of inclination may result in a fluttering motion which is attractive to fish. Thus, reference to the angle of fifty-three degrees encompasses some latitude from this specific value.

It should be apparent to those skilled in the art that a number of variations can be made in the releasable retaining mechanism 39. For example, the dimples may be formed from the opposite sides of the respective rudder portions 28 and 29 to provide a pair of opposing bosses which are drawn into point contact with one another by the clamping force. The position of the releasable retaining mechanism 39 may also be varied. For example, by positioning the releasable locking mechanism 39 close to the top rivet 32, the down rigger wire 14 is not tightly confined by the guideway. Instead, the diving plane 16 may pivot upward slightly to disengage the lower rivet 33 from the down rigger wire 14 and to thereby increase the angle of the deflection plate with respect to the surface of the water. This freedom of movement may improve performance of the diving plane at great depths where the deflection plate angle is at a minimum. Also, the rivets 32 and 33 serve to retain the diving plane sections 24 and 25 in alignment with one another and to define longitudinal extent of the guideway which maintains the diving plane 16 in the proper attitude with the wire 14. Other means which provide these functions and which withstand the abrasion of the wire 14 are suitable. For example, the guideway may be formed as a vertically extending plastic sleeve in which an entry slot is formed along its front to allow the insertion and removal of the down rigger wire 14. The sleeve may be integrally molded to the rudder of an all plastic diving plane, with the slot formed smaller than the down rigger wire 14 to act as resilient jaws of a retaining mechanism.

A diving plane for deep trolling has been shown and described which descends downward along a down rigger wire in response to water action on a deflection plate, so that the down rigger wire need not be drawn upward when it is desired to lower the fishing line. It also frees itself from the wire when a fish becomes hooked, and as a result, frequent manipulation of the wire is eliminated. This diving plane has a guideway into which the wire is inserted through a releasable retaining mechanism at the front of the guideway. The guideway preferably has a substantial longitudinal length for retaining correct orientation with the wire, and the deflection plate portions of the device preferably extend rearward of the guideway portion. In the preferred embodiment there is also an upright rudder portion, of which the guideway is a part, and from which the deflection plate extends outward on both sides, such rudder portion being behind the releasable wire retaining mechanism to add to the stability of the device as it moves along in the water. The rudder portion may also function as a convenient element for adjusting pressure of the jaws of the releasable retaining mechanism and for attachment of a fishing line and lure.

We claim:

1. A diving plane for a down rigger, the combination comprising:
   a rudder;
   a deflection plate connected to said rudder and disposed to either side thereof in a plane substantially perpendicular thereto;
   first means for securely fastening said diving plane to a fishing line; and
   second means connected to said rudder portion to form a guideway for a down rigger wire which is disposed at an oblique angle with respect to said deflection plate, said second means also providing means to releasably retain a down rigger wire in said guideway.

2. A diving plane for a down rigger, the combination comprising:
   a rudder formed by two upright rudder portions which are connected together by means which inhibit the lateral movement of said rudder portions with respect to one another;
   a deflection plate formed by two portions which connect with the respective upright rudder portions and extend outward therefrom;
   guide means disposed between said upright rudder portions to provide a guideway for a down rigger wire which is oriented at an oblique angle with respect to said deflection plate; and
   a releasable retaining mechanism disposed between said upright rudder portions and operable to releasably and slidably retain a down rigger wire in said guide means.

3. The diving plane as recited in claim 2 which includes an adjustable fastening device connected to said upright rudder portions to provide a clamping force, and said releasable retaining mechanism includes a pair of balls which are disposed between said upright base portions and held in point contact with one another by said clamping force.

4. The diving plane as recited in claim 3 in which said guide means includes a pair of rivets which connect said upright rudder portions and are aligned along a line which intersects the plane of the deflection plate at an angle of approximately 53°, said guideway being formed by said rivets and said releasable retaining mechanism.

5. In a diving plane for attachment to a down rigger wire and submerging a fishing lure, the combination comprising:
   a central member;
   a deflection plate branching sideward from each side of the central member; and
   a releasable retaining mechanism on said central member having opposing jaws resiliently held to spread apart and admit the passage of a down rigger wire from the front of the diving plane and to return toward one another after being spread to pass the wire, such retaining mechanism being above and at the front of the deflection plate to orient the deflection plate at an upward and rearward tilt as the diving plane is drawn through water by the down rigger wire.

6. In a diving plane for attachment to a down rigger wire and submerging a fishing line, the combination comprising:
   a central, upright rudder having a front margin and bottom line slanting upward and rearward with respect to the front margin;
   a releasable retaining mechanism for receipt of a down rigger wire positioned in said front margin of said rudder;
   a deflection plate projecting sideward from each side of said rudder along said rudder bottom line and leaving its major surface area trailing behind said releasable retaining mechanism; and
   means for attaching a fishing line and a fishing lure to said diving plane.

7. In a down rigger having a weight suspended from a boat by a down rigger wire, an improved means for depressing a fishing line to a selected depth comprising a diving plane having means for slideably attaching said diving plane to said down rigger wire, having means for securely fastening said diving plane to said fishing line, and having a deflection plate which is disposed at an inclined angle when the diving plane is slideably attached to said down rigger wire to generate a downward force which slides said diving plane and attached fishing line down said down rigger wire to said selected depth as the boat moves through the water, said slideable attachment means also including means for releasing said diving plane from said down rigger wire when a fish strikes said fishing line.

* * * * *